April 29, 1941.   G. A. LYON   2,239,897
METHOD OF MAKING WHEEL DISKS
Filed June 4, 1938   4 Sheets-Sheet 1
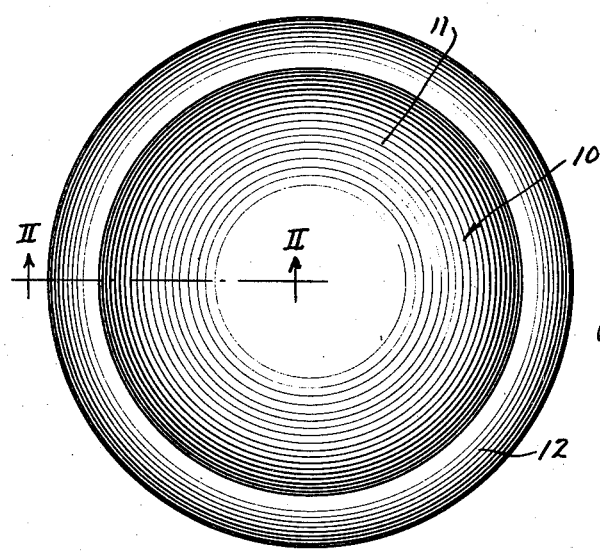
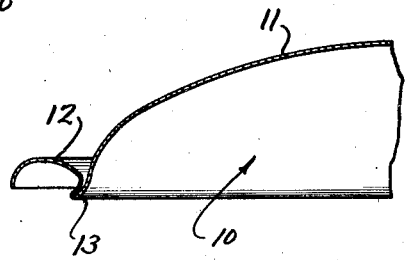
Inventor
GEORGE ALBERT LYON.
by

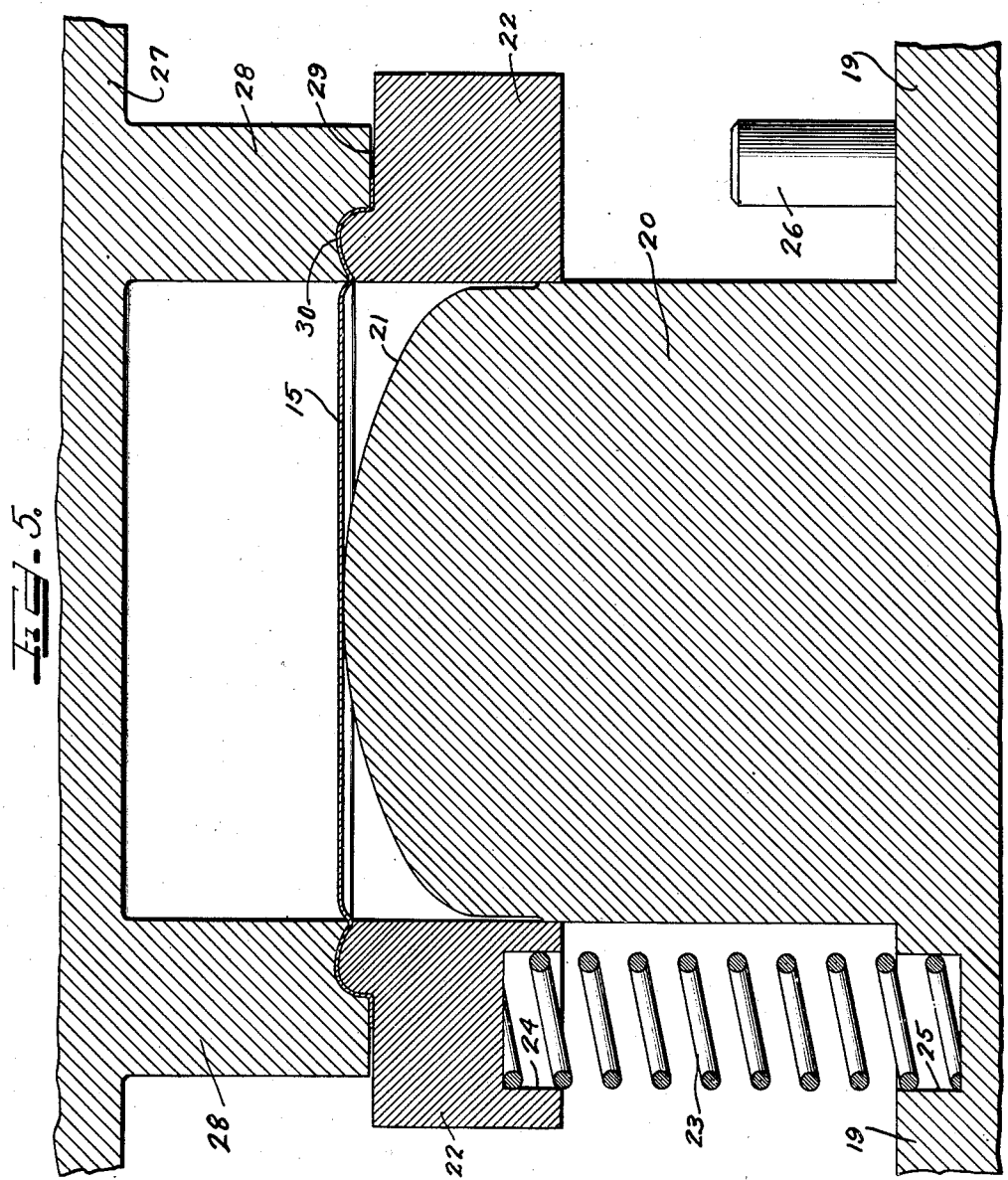

April 29, 1941. G. A. LYON 2,239,897
METHOD OF MAKING WHEEL DISKS
Filed June 4, 1938 4 Sheets-Sheet 3

Inventor
GEORGE ALBERT LYON.
by

April 29, 1941.  G. A. LYON  2,239,897
METHOD OF MAKING WHEEL DISKS
Filed June 4, 1938  4 Sheets-Sheet 4
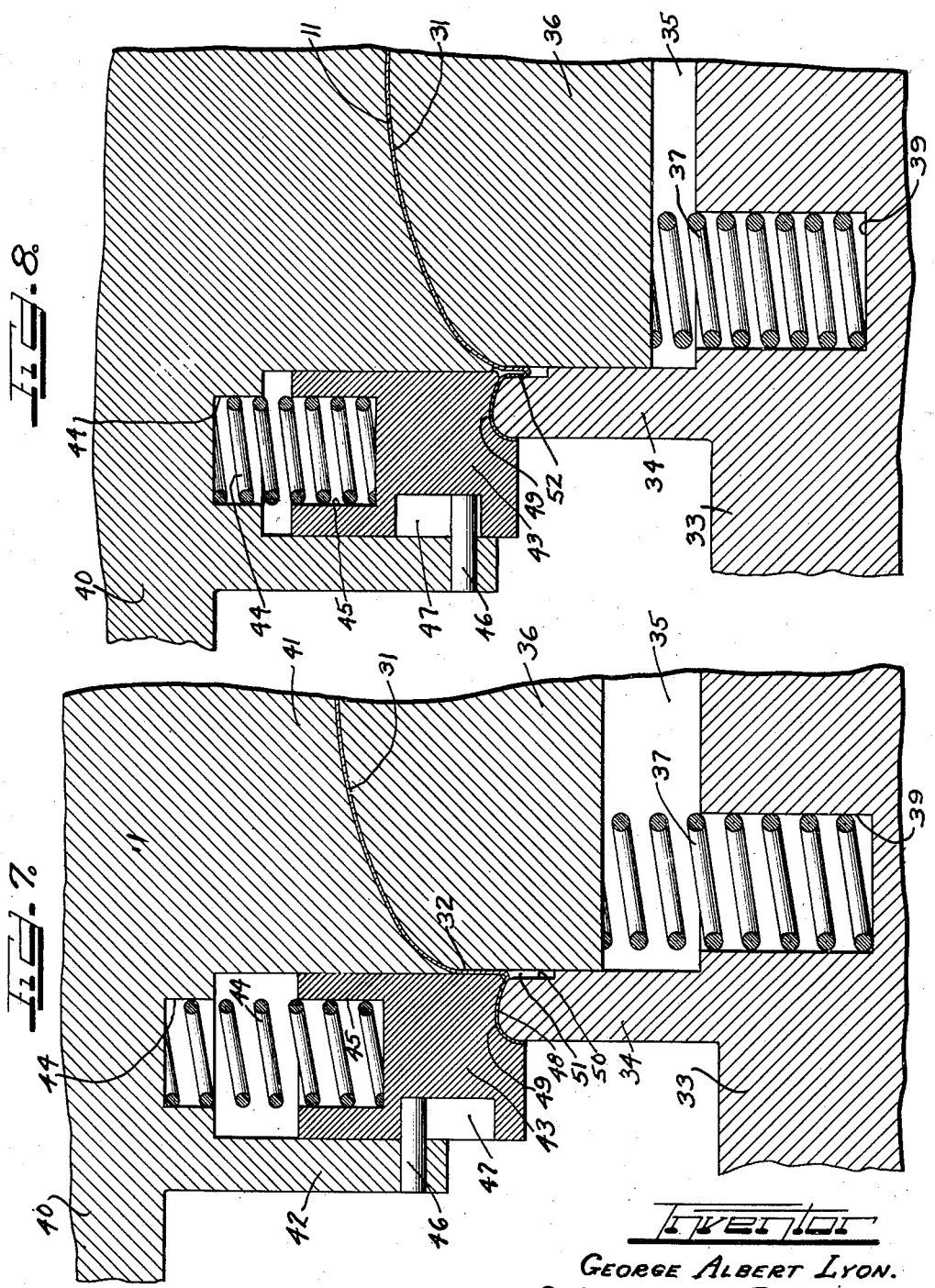
Inventor
GEORGE ALBERT LYON.
by Charles Hill
Attys.

Patented Apr. 29, 1941

2,239,897

UNITED STATES PATENT OFFICE 2,239,897

METHOD OF MAKING WHEEL DISKS

George Albert Lyon, Allenhurst, N. J.

Application June 4, 1938, Serial No. 211,781

3 Claims. (Cl. 113—116)

This invention relates to a method of making wheel disks, and more particularly to a novel method for making wheel disks of the type having an integral folded fastening flange which provides the wheel disk with a double thickness of metal in that area.

The majority of vehicle wheels of the present day are equipped with ornamental wheel disks over their outer surfaces. The use of these wheel disks permits a more economical manufacture of vehicle wheels, since the wheels themselves may be designed solely for strength and utility without regard to ornamental appearance, the wheel disk being employed for the latter purpose. The most popular form of wheel disk at the present time is a wheel disk having a highly polished exterior surface. In order to minimize the total cost of the wheel assembly, it is, of course, necessary to minimize the cost of the wheel disk itself as much as possible. The thinner the sheet metal stock is, which is employed to make a wheel disk, the greater the saving is in the manufacturing costs. It has been found that a wheel disk may be constructed of a sheet of metal stock having a thickness dimension of such a character that if a single thickness of the metal stock is engaged by the resilient wheel disk fastening elements on the wheel, the metal of the disk would be deformed at that point, but which, when presented as a double thickness of metal formed by a fold, the metal in the disk in the point of engagement of the wheel disk fastening element is not deformed.

It is an object of the present invention to provide a novel method for manufacturing wheel disks possessing the above highly desirable characteristics.

It is another object of this invention to provide a novel method for manufacturing wheel disks which is extremely economical and which provides a resulting product which is rugged and reliable in use.

It is a further object of the present invention to provide a novel method for manufacturing wheel disks having an integral folded flange which provides the wheel disk with a double thickness of metal where it is engaged by the resilient wheel disk retaining elements of the wheel.

It is a still further object of this invention to provide a novel method for manufacturing wheel disks of the type having an integral folded fastening flange.

It is another and still further object of this invention to provide a novel method for first forming an axially extending integral folded fastening flange and thereafter bending the folded fastening flange at an oblique angle to provide the desired spring element engaging fastening flange for the wheel disk.

It is a still further object of this invention to provide a novel process for manufacturing a wheel disk.

The novel features which I believe to be characteristic of my invention are set forth with particularity in the appended claims. My invention itself, however, both as to its organization and manner of construction, and method of operation, together with further objects and advantages thereof, may best be understood by reference to the following description, taken in connection with the accompanying drawings, in which:

Figure 1 is a front elevational view of a wheel disk of the type which is produced by my novel method and apparatus;

Figure 2 is a fragmentary cross-sectional view of the wheel disk taken along the line II—II of Figure 1;

Figure 3 is an illustration of a sheet of metal stock from which the wheel disk is made;

Figure 4 is a cross-sectional view of the metal stock of Figure 3 after it has passed through the first pre-forming stage of my novel process;

Figure 5 is a cross-sectional elevational view of a die press showing the metal article or form of Figure 4 mounted therein awaiting the second die forming step of the process;

Figure 7 is a fragmentary cross-sectional elevational view of a portion of the die press in which the integral folded flange of the wheel disk is formed; and Figure 8 is a view similar to Figure 7, but shows the die press at the completion of its flange forming operation.

Figure 6:
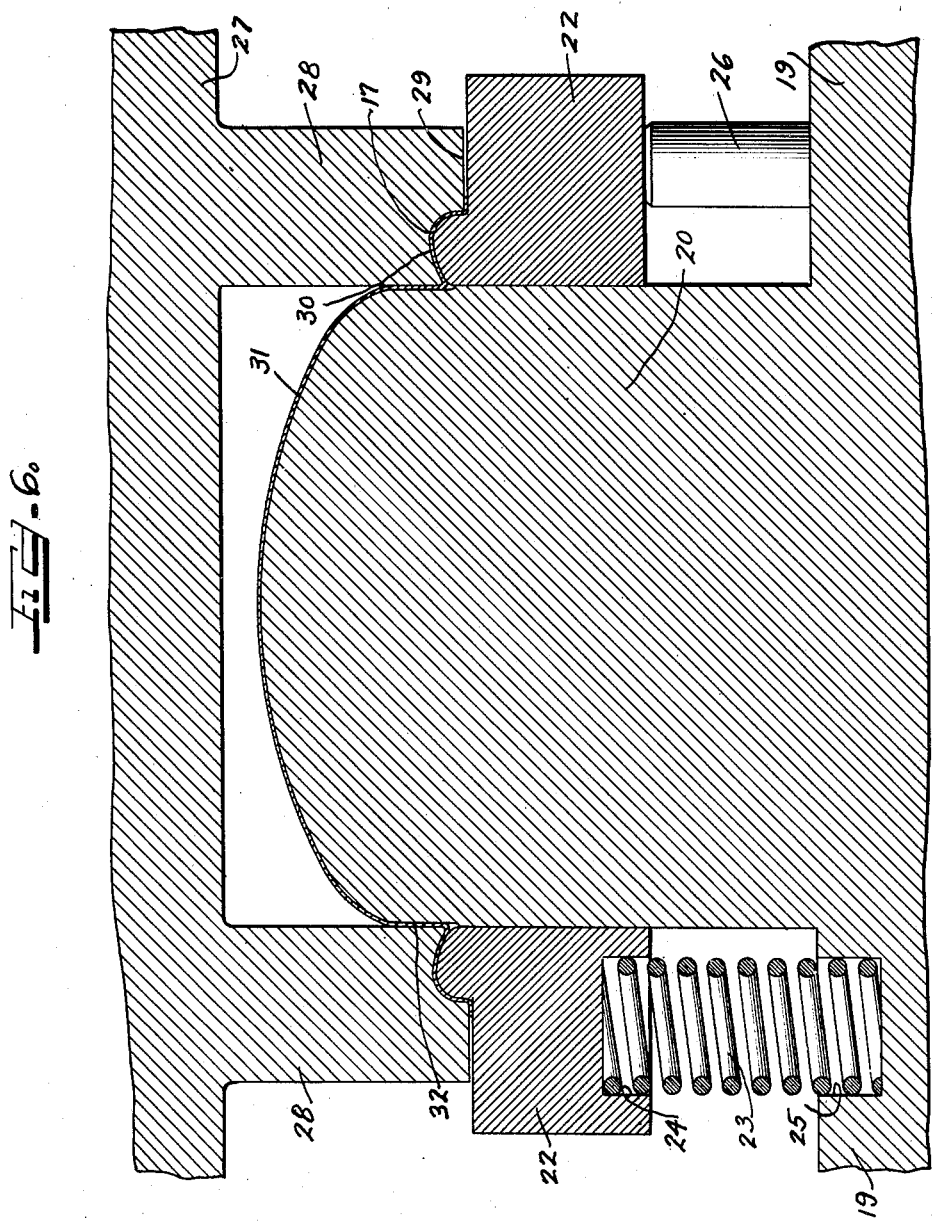
Figure 6 is a view similar to Figure 5 showing the die press at the completion of its die forming operation on the sheet metal article.

In the various figures of the drawings, I have illustrated a method of and an apparatus for forming an integral folded fastening flange in a wheel disk structure which provides the wheel disk with a double thickness of metal where it is engaged by the resilient wheel disk retaining elements of the wheel. In this instance, the disk structure is of the type which overlies the outer side surface of the vehicle wheel, being held in position upon the wheel by resilient wheel disk retaining elements mounted on and carried by the body part of the wheel, and the outer periphery of the disk falls within the outer circumferential edge of the tire rim.

In Figures 1 and 2 of the drawings, I have illustrated the resulting product as formed by the novel method and apparatus presently to be described. In order that the various steps of the process will appear clear as they are described, it is believed advisable to illustrate and describe the resulting product prior to a description of the process and the apparatus for carrying out the process.

Referring to Figures 1 and 2, there is illustrated therein a wheel disk 10 which includes a central dome shaped portion 11 and an outer ring portion 12. At the junction of the central crown portion 11 with the outer ring portion 12, an integral depending folded fastening flange 13 is provided which extends obliquely axially rearwardly and radially outwardly. The folded flange 13 is arranged to be engaged by resilient wheel disk fastening elements (not shown) carried on the wheel.

While the central crown portion 11 of the wheel disk 10 has been illustrated as a simple convex surface, and while the outer ring portion 12 has also been illustrated as having a convex cross-sectional configuration, it will, of course, be understood by those skilled in the art that any suitable configuration may be given these portions of the wheel disk without departing from the spirit and scope of the present invention.

The novel process and apparatus by which the wheel disk illustrated in Figures 1 and 2 of the drawings is made will now be described. A piece of sheet metal stock 14, such as that illustrated in Figure 3 of the drawings, is pre-formed to the shape shown in Figure 4. Specifically, the sheet metal stock 14 now includes a flat central portion 15, an annular groove or depressed portion 16, an annular ring portion 17, and a hold down portion 18.

The sheet metal stock 14 which has been employed to make the form above described, may be of any suitable material, but it is preferably formed of a relatively thin sheet of stainless steel having slightly resilient characteristics.

The form illustrated in Figure 4 is now set in a die press, preferably of the form and character shown in Figure 5. The die press of Figure 5 comprises a lower die block 19, having an upstanding die portion 20 which terminates in a dome shaped die surface 21. Extending around the upstanding die portion 20 is a reciprocable hold down ring 22 which is normally urged upwardly by a plurality of springs 23 circumferentially spaced about the central die portion 20. The springs 23 are preferably seated in confronting recesses 24 and 25 in the hold down ring 22 and die block 19 respectively. The lowermost position of the hold down ring 22 is limited by a plurality of stop blocks 26 mounted on the lower die block 19 and spaced between the springs 23. The upward movement of the hold down ring 22 caused by the biasing force of the springs 23 is limited in any suitable manner (not shown). The press illustrated in Figure 5 also includes an upper die member 27 having a depending die ring 28. The lower surface of the die ring 28 includes a flat hold down portion 29 and a die portion 30, which is provided with the same configuration as the upper surface of the ring portion 17 of the metal stock 14.

As the upper die member 27 is lowered, the hold down portion 29 of the depending die ring 28 engages the hold down portion 18 of the sheet metal form and the die portion 30 at the same time engages the ring portion 17 to firmly hold the outer portion of the metal form in place. As the downward movement of the upper die member 27 continues, the metal in the central portion 15 of the metal form is drawn over the dome shaped lower die surface 21 of the die block 20. This downward movement of the upper die member 27 continues until the hold down ring 22 abuts the stop members 26 on the die block base 19. The metal article now has the configuration as is shown in Figure 6 of the drawings, and the various members of the press at the conclusion of this forming step are also clearly shown in Figure 6.

It will be observed that during the drawing operation in the press shown in Figures 5 and 6, the metal which forms the hold down portion 18 of the metal article has slipped slightly, thus making the width of the annular band which forms the hold down portion 18 slightly less in width than it was prior to its insertion in the press illustrated in Figures 5 and 6.

The metal article or form as it now appears at the conclusion of the pressing operation shown in Figure 6, includes a central crown portion 31 which merges into a cylindrical portion 32, the latter portion 32 extending between the inner edge of the ring portion 17 and the outer edge of the crown shaped portion 31.

The upper die member 27 is now raised, and the metal article or form is removed from this press and put into another press for the purpose of forming an integral depending folded flange presently to be described. One form of die press which has been found highly satisfactory for this purpose has been illustrated in Figures 7 and 8 of the drawings, only that portion of the press which is essential to a clear understanding of the carrying out of the process, however, being illustrated in order to simplify the drawings as much as possible commensurate with a clear understanding of the invention.

Referring first to Figure 7, the die press which is fragmentarily illustrated therein includes a lower die block 33 having an upstanding solid die ring 34 defining an interior opening 35 above the base of the die block. Inside the opening 35 is a reciprocal die pad 36 normally urged upwardly by a plurality of springs 37 or the equivalent disposed and carried in recesses 39 on the base of the die block, and bearing against the underside of the die pad 36. The outward movement of the pad 36 is limited in any suitable manner (not shown). As seen in Figure 7, the die pad 36 is in its uppermost position.

The die press illustrated in Figure 7 also includes an upper die 40 which is provided with a central depending die portion 41 complemental in character to the aforesaid die pad 36. Spaced from the central die part 41 is a depending fixed ring 42, and in the space between this ring 42 and the die part 41 is a reciprocal hold down ring 43, which is normally urged downwardly by a plurality of springs 44, or their equivalent, each of which is seated in a confronting recess in the die 40 and the hold down ring 43 respectively, as at 44 and 45. The downward movement of the hold down ring 43 with respect to the central die part 41 is limited by a plurality of pins 46, each firmly fixed in the stationary ring 42, and an end of which extends into a suitable recess 47 in the hold down ring 43. As the hold down ring 43 is seen in Figure 7 it is in its lowermost position with respect to the central die part 41.

The upper surface 48 of the die ring 34 of the lower die member 33 is shaped to have the ring portion 17 of the metal article formed in the press of Figure 6 intimately seated thereon, and the opposing face 49 of the hold down ring 43 is shaped complemental to the surface 48 so as to intimately engage the upper portion of the ring portion 17. A cut out recess is provided on the upper inner side of the die ring 34, as at 50. The side wall 50 of the cut out portion of the die ring 34 in conjunction with the side wall of the die pad 36 provides a confined forming space 51 in which the folded flange of the wheel disk will be formed.

From a careful inspection of Figure 7 it will be observed that the portion of the die ring 34 which lies immediately below the cylindrical portion 32 is cut away in such a manner that upon the application of an axial pressure to the upper die member 40, the metal in the article forming the cylindrical portion 32 will be forced or pushed downwardly into the confined forming space 51. More specifically, as a downward force is applied to the central crown shaped portion 31, the metal forming the cylindrical portion 32 is progressively rolled and unrolled down into the forming space 51 until the crown portion 31 has reached a position shown in Figure 8 of the drawings. As is clearly shown in Figure 8, the metal which in Figure 7 formed the cylindrical portion 32 has now been folded downwardly into the forming space 51 into an integral depending folded flange 52. As will at once be observed from an inspection of Figure 8, the folded flange 52 provides a double thickness of metal at this point.

The forcing or rolling of the metal of the cylindrical or axial portion 32 down into the confined forming space 51 is greatly assisted by the acute disposition of the adjacent portion of the ring portion 12 with respect to the cylindrical or axial portion 32. That is to say, since the adjacent portion of the ring portion 12 which extends away from the lower end of the axial or cylindrical extending portion 32 is inclined downwardly as the elements are viewed in Figure 7, it will at once be appreciated that when axial pressure is first applied to the dome-shaped portion 31 there is less danger of rupture of the metal blank and the progressive rolling of the metal in the axial portion 32 down into the confined forming space 51 is easily started.

At the completion of the pressing operation, as shown in Figure 8, the upper die member 40 is raised and the metal article lying on the die pad 36 and the lower die ring 34 is removed from the press. This article is now taken and by any suitable rolling, spinning or pressing operation the depending folded flange 52 is bent obliquely radially outwardly until it has assumed the shape illustrated in Figure 2 and identified by the reference character 13. The wheel disk is now completed and includes a central crown shaped portion 11, an outer ring portion 12, and a depending integral folded fastening flange 13.

Separate numerals were employed to identify the various portions of the sheet metal article during the various steps of the process from those applied to the finished article in order to avoid confusion. By way of summary, it may be stated that the original piece of metal stock from which the wheel disk is to be formed was identified by the reference character 14. The first shaping of the crown portion 11 of the wheel disk 10 was identified by the reference character 15, while the second forming step of the crown portion 11, wherein the crown formation was given the central part 15, was identified by the reference character 31. Similarly, the initial shape which is given to the outer ring 12 of the wheel disk 10 was identified by the reference character 17 during the preliminary stages.

No specific mention has been made during the description of the process as to the time when the hold down portion 18 of the metal article is trimmed off. This is by reason of the fact that it may be trimmed off either following the forming step as shown in Figure 6 and prior to insertion in the press in Figure 7, or else after the flange forming operation as shown in Figure 8. The hold down portion 18 may be trimmed off in any manner well known to those skilled in the art.

While I have shown one particular way in which the depending folded flange 52 may be bent to form the fastening flange 13 of the wheel disk 10, it will, of course, be understood that the fastening flange 13 may be formed by having it extend obliquely rearwardly and radially inwardly without departing from the spirit and scope of the present invention.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. The process of manufacturing a wheel disk having an integral obliquely extending fastening flange which includes stamping a sheet metal blank into a form having a substantially flat central portion and an outer ring portion of predetermined configuration with an annular groove formed therebetween, drawing said central portion into a crown portion while maintaining the configuration of said ring portion, and pressing said crown portion toward said ring portion while substantially maintaining the configuration of both of said portions while simultaneously causing a portion of the metal in said crown portion adjacent said groove to collapse progressively away from the original position of said groove into a folded axially rearwardly extending integral depending flange, and thereafter obliquely bending said flange to form a wheel disk fastening flange over which resilient wheel disk mountings elements may be snapped.

2. The process of manufacturing a wheel disk having an integral fastening flange which includes stamping a sheet metal blank into a form having a substantially flat central portion and an outer ring portion of predetermined configuration with an annular groove formed therebetween, drawing said central portion into a crown portion while maintaining the configuration of said ring portion, and pressing said crown portion toward said ring portion while substantially maintaining the configuration of both of said portions while simultaneously causing a portion of the metal in said crown portion adjacent said groove to progressively roll away from the original position of said groove down into a confined forming space to form a folded axially extending flange portion, and thereafter bending said axially extending flange portion into a conical position.

3. The process of manufacturing a circular disk having an integral laterally extending flange on one side which includes stamping a sheet metal blank into a form having a circular central portion and an outer ring portion of predetermined configuration with an annular groove formed between said portions, drawing said central portion into a crown portion while maintaining the configuration of said ring portion, and pressing said crown portion toward said ring portion while substantially maintaining the configuration of both of said portions and also simultaneously causing a portion of the metal in the crown portion adjacent said groove to roll progressively away from the original position of the groove down into a confined forming space to form a folded laterally extending integral flange.

GEORGE ALBERT LYON.